Nov. 16, 1926.

W. N. HOWARD 1,607,125

INDEXING AND FILING DEVICE

Filed May 29, 1924     2 Sheets-Sheet 1

Inventor:
W. N. HOWARD
By B. J. Craig
Attorney.

Nov. 16, 1926.

W. N. HOWARD 1,607,125

INDEXING AND FILING DEVICE

Filed May 29, 1924   2 Sheets-Sheet 2

FIG.3

| SHEET NO. 650 E | 22 | 5 | | | | |
|---|---|---|---|---|---|---|
| Breum, Emil | | ADDRESS | | | | Acct No. 5 — 27 |
| OLD BALANCE | DATE | CHECKS IN DETAIL | DATE | DEPOSITS | DATE | NEW BALANCE |
| | | BALANCE BROUGHT FORWARD | | | | |

| SHEET NO. 650 E | | 5 | | | | |
|---|---|---|---|---|---|---|
| Brown, Edward E. | | ADDRESS | | | | Acct No. 4 — 26 |
| OLD BALANCE | DATE | CHECKS IN DETAIL | DATE | DEPOSITS | DATE | NEW BALANCE |
| | | BALANCE BROUGHT FORWARD | | | | |

| SHEET NO. 650 E | | 5 | | | | |
|---|---|---|---|---|---|---|
| Brown, Emma F. | | ADDRESS | | | | Acct No. 3 — 25 |
| OLD BALANCE | DATE | CHECKS IN DETAIL | DATE | DEPOSITS | DATE | NEW BALANCE |
| | | BALANCE BROUGHT FORWARD | | | | |

| SHEET NO. 650 E | | 5 | | | | |
|---|---|---|---|---|---|---|
| Brown, Elsie M. | | ADDRESS | | | | Acct No. 2 — 24 |
| OLD BALANCE | DATE | CHECKS IN DETAIL | DATE | DEPOSITS | DATE | NEW BALANCE |
| | | BALANCE BROUGHT FORWARD | | | | |

| SHEET NO. 650 E | | 5 | | | | |
|---|---|---|---|---|---|---|
| Brehm, Evelyn | | ADDRESS | | | | Acct No. 1 — 23 |
| OLD BALANCE | DATE | CHECKS IN DETAIL | DATE | DEPOSITS | DATE | NEW BALANCE |
| | | BALANCE BROUGHT FORWARD | | | | |

FIG.4

| 11 — 650 A SHEET NO. | | 1 | /14 | | | |
|---|---|---|---|---|---|---|
| 12 — Brown, Addison | | ADDRESS | | | | Acct No. 2 |
| OLD BALANCE | DATE | CHECKS IN DETAIL | DATE | DEPOSITS | DATE | NEW BALANCE |
| 15 — | | BALANCE BROUGHT FORWARD | | | | |
| 10 — | | | | | | |

INVENTOR.
W. N. HOWARD
BY B. J. Craig
ATTORNEY.

Patented Nov. 16, 1926.

1,607,125

UNITED STATES PATENT OFFICE.

WILLIAM N. HOWARD, OF LOS ANGELES, CALIFORNIA.

INDEXING AND FILING DEVICE.

Application filed May 29, 1924. Serial No. 716,555.

This invention relates to indexing and filing devices.

The general object of the invention is to provide an improved indexing and filing device which will enable cards bearing various information to be quickly filed or removed from a file.

One of the specific objects of the invention is to provide a combined index and file wherein individual sheets are grouped according to a definite surname arrangement and wherein the sheets in each group are again grouped under an alphabetical arrangement of given names.

Another object of the invention is to provide an index wherein the proper index reference to two or more spaced columns may be noted in a single table arranged between the columns.

A further object of the invention is to provide an index which is compactly arranged and wherein the total number of subjects indexed may be quickly determined.

Other objects of the invention will be apparent from the following description taken in connection with the accompanying drawings wherein Fig. 1 is a fragmentary elevation of a group of my improved cards; Fig. 2 is a view similar to Fig. 1 showing the index card; Fig. 3 is a similar view showing the individual cards which are listed and assembled under a sub-group or set heading and Fig. 4 is a similar view of a card from the same set as the top card in Fig. 1.

Referring to the drawing by reference characters, I have shown a card embodying the features of my invention at 10. This card may be provided with data such as a sheet number at 11, a name which includes a surname and given name at 12. The sheet may be provided with an address space 14. Columnar headings 15 may be provided which include "Old balance", "Date", "Checks in detail", "Date", "Deposits", "Date" and "New balance". These headings may be used when my invention is used by banks although the headings and divisions are merely indicative of one of many uses to which may invention can be put.

A complete index, according to my invention, includes a set of index sheets 16 (Fig. 2) as well as a plurality of groups of cards. A group of cards is shown in Fig. 1 where the cards are disposed one on top of another, the overlapping edges carrying the signals being shown at 17.

Each group of cards comprise a plurality of sets of cards. Each group includes cards having surnames thereon which have certain common characteristics including a common initial while each sub-group or set includes cards bearing given names having certain common characteristics. This surname grouping may be according to any approved system either alphabetic, or based on consonants, on vowels, on vowels and consonants, etc.

As shown, the grouping is based on consonants, each of which is given a definite numerical value. In the illustration the names, Brehm, Brown, Barron, etc. all have a numerical value equaling 650 but I have merely selected this group as typical of many groups.

As stated all the name-cards would be divided into groups with the surname in each group having certain common characteristics. In the following description I have described but one group of the entire index but it will be understood that the other groups would be similar in arrangement.

In the drawing in Fig. 1 I illustrate a group of cards wherein the cards are all of the class which would be classified in the group having the surname numerical value of 650.

The cards shown in Fig. 1 are provided with signals 19 thereon. In every group the signals displayed preferably run consecutively 1, 2, 3, 4, 5, 6, 7, 8, 9, 0, with the arrangement repeated so that in each group 20 signals are visible.

In making the top card of the group shown in Fig. 1 the operator would preferably first fill in the surname Brehm and would then insert the given name Alexander. The number 650 would be noted on this card as well as all of the cards of this group, as well as the designation 20 which would correspond to some characteristic of the given name. In the present instance, I have shown the designating mark 20 as the letter A which corresponds to the initial in the given name Alexander.

According to my system the cards of each group comprising the first set bear the signal 1, as shown at 19 in Fig. 1 and they would receive the given names beginning with A. The cards bearing the signal 2 would receive the names whose given names begin with B. The cards bearing the signal 3 would receive the C names, etc., down to the ninth card whereon I would preferably combine the initials I and J. K would occupy the next card bearing a zero signal with N, O disposed on the right third card, P, Q on the fourth right card, and in regular order with U, V on the eighth right card, W on the ninth card and X, Y, Z on the zero right card.

From the foregoing description it will be seen that after the names have been segregated into the groups according to some common characteristic of the surname, these names will again be classified in sets with the given names showing a common characteristic such as an initial in sets to themselves.

In filing these cards the first card which would be placed in each set would be marked Acct. No. 1, as at 21. The second card of the set which would appear immediately behind the first card would be marked Acct. No. 2. This is shown in the drawing where the first card in the first set—that is, the set bearing the signal 1—is shown in Fig. 1 and the second card in this set is shown in Fig. 4. In Fig. 3 I have shown five cards disposed one above the other. It will be noted here that each of these cards has the surname with such characteristic that it is thrown into the numerically numbered 650 group. The given names of the cards in Fig. 3 all begin with E and consequently these cards have the E classification as at 22. These cards are also provided with the signal 5 as shown.

The first card which is placed in the file would be marked Acct. No. 1 as at 23, the second card Acct. No. 2 as at 24, and in order the accounts would be numbered as at 25, 26 and 27. The account number therefore may indicate the relative order in which the cards in each set were filed.

In order to readily find whether or not certain names are shown in this index and if so to determine their location and to facilitate their selection I show in Fig. 2 an index card for the 650 group which may be considered a component part of my invention. This index card is provided with columnar headings consisting of a number column at 30 along one edge and a second number column 31 along the other edge. The card is also provided with vertical columns 33 and 34 to receive the names as they are entered thereon. The index card is also provided with a table 35 which is provided with columns each having a double heading. The lower heading 36 comprises the numbers from 1 to 9 then naught, repeated again 1 to 9 then naught. The top heading 37 is alphabetically arranged a, b, c, etc., corresponding to the letters selected to accompany the numbers as already explained.

In using the index shown in Fig. 2 with my improved cards the first name would be entered at the left in the first space of column 33 as at 38. This name Alexander Brehm would throw this name into the A set—that is, into the 1 set. To distinguish this a numeral 1 would be placed at 40 in the upper half of the horizontal column in which the name Alexander Brehm was placed. The next name to be entered might be that of J. J. Brown and would be entered in the first space of the right-hand column 34. The initial heading J in this case would throw Brown's card into the left-hand nine set and to indicate this as 1 would be inserted in the lower half of the horizontal column wherein the name J. J. Brown appears as at 41. This method of entry would be continued in regular order with a 1 being inserted to indicate the set of the cards in which we might look for a particular card. When a card appears which would be the second card in a set, for instance as at 43 where at the right-hand side of Fig. 2 the name of John N. Brown appears, then instead of entering a 1 in the column we would enter a 2 as at 44 to indicate that John N. Brown's card is the second card in the set. Referring to the fifth initial column at the left, as shown at 45, in Fig. 2 it will be noted that five numbers appear in this column indicating that there are five cards in the set. Should other names be entered in this column the next would be Acct. No. 6 and would be placed sixth in the E or fifth group and so on.

From the foregoing description it will be noted that the names at the left are indexed in the table at the upper half as at 40 of each transverse column, while the right-hand names are indexed in the lower half of each horizontal column.

My invention is of great aid in taking off balances and in figuring accounts as the operator can very easily determine the number of accounts present by adding the numbers appearing opposite the names at the right and left-hand sides.

The device is very useful in searching; for instance, if we were looking for a name having the 650 value, wherein the initial of the given name began with a D it would be only necessary to look on the 650 index card in the column indicated by reference character 46, and if we noted that this column was blank it would at once indicate that there were no 650 group names wherein the given name initial began with a D. Should any names be dropped from the list, a circle would be drawn around the number in the index designating the name so that the unused name could be very easily detected.

When a group of cards such as shown in Fig. 1 is used wherein the names in the group do not include certain initials in the various given names the operator could detect this omission by noting which numbers were missing from the group shown in Fig. 1. For instance, in reading the signals from the left should he detect that the numeral 4 or signal 4 which ordinarily should appear at 50 was missing he would know at once that there were no names having the initials D in this group. He could do this without use of the index card.

Having thus described my invention, I claim:

1. In an index device, an index sheet comprising a body ruled to provide horizontal columns which extend entirely across the sheet, said horizontal columns at each edge of the sheet formed into vertical columns for the reception of names to be indexed, the center portion of said sheet including a table for checking given names, said table including vertical columns having lettered headings so that the given name may be checked under the letter corresponding to the initial of the given name.

2. In an index device for cards, an index sheet ruled to provide horizontal columns which extend entirely across the sheet, said horizontal columns at each edge of the sheet being provided with vertical columns for the reception of names to be indexed, the center portion of said sheet including a table having signals displayed thereon, said table serving for checking given names, the horizontal columns of said table each being subdivided into two parts whereby said checking may be done for names in both the vertical columns of the index sheet, said vertical columns each having their spaces numbered consecutively.

In testimony whereof, I hereunto affix my signature.

WILLIAM N. HOWARD.